United States Patent [19]
Taniguchi et al.

[11] Patent Number: 4,831,636
[45] Date of Patent: May 16, 1989

[54] CODING TRANSMISSION EQUIPMENT FOR CARRYING OUT CODING WITH ADAPTIVE QUANTIZATION

[75] Inventors: Tomohiko Taniguchi, Wakayama; Kohei Iseda, Yokohama; Yoshihiro Tomita; Fumio Amano, both of Tokyo; Shigeyuki Unagami, Atsugi; Shoji Tominaga, Yokohama, all of Japan

[73] Assignee: Fujitsu Limited, Kawasaki, Japan

[21] Appl. No.: 134,818

[22] Filed: Dec. 18, 1987

Related U.S. Application Data

[63] Continuation-in-part of Ser. No. 879,962, Jun. 30, 1986, abandoned.

[30] Foreign Application Priority Data

| Jun. 28, 1985 | [JP] | Japan | 60-142307 |
| Jan. 29, 1986 | [JP] | Japan | 61-15784 |
| Mar. 20, 1986 | [JP] | Japan | 61-60972 |
| Apr. 9, 1986 | [JP] | Japan | 61-80063 |
| Dec. 19, 1986 | [JP] | Japan | 61-304572 |

[51] Int. Cl.$^4$ ............................................. H04B 14/06
[52] U.S. Cl. .................................. 375/27; 358/133; 358/260; 375/33
[58] Field of Search ............... 375/27, 30, 33; 358/13, 358/133, 136, 260

[56] References Cited

U.S. PATENT DOCUMENTS 4,633,325 12/1986 Usubuchi ........................... 375/27

Primary Examiner—Robert L. Griffin
Assistant Examiner—Marianne Huseman
Attorney, Agent, or Firm—Staas & Halsey

[57] ABSTRACT

Coding transmission equipment wherein an plurality of adaptive coding units having different processing characteristics are provided, and the adaptive coding unit having the optimum processing characteristic for a current input signal is selected from among the plurality of adaptive coding units, and an output signal from the optimum adaptive coding unit and the unit number thereof are transmitted to the receiver side. At the receiver side, the processing characteristic of a decoder is changed to become the optimum processing characteristic indicated by the received unit number, whereby a high quality recovered signal is realized.

46 Claims, 13 Drawing Sheets

| N | | ECC | | TRANSMISSION CODE | | | |
|---|---|---|---|---|---|---|---|
| high | low | high | low | ECC(h) | N(h) | ECC(ℓ) | N(ℓ) |
| 0 | 0 | 0 0 | 0 0 | 0 0 | 0 | 0 0 | 0 |
| 0 | 1 | 0 0 | 1 1 | 0 0 | 0 | 1 1 | 1 |
| 1 | 0 | 1 1 | 0 0 | 1 1 | 1 | 0 0 | 0 |
| 1 | 1 | 1 1 | 1 1 | 1 1 | 1 | 1 1 | 1 |

| REC. CODE | | ERROR CORRECTED OUTPUT | |
|---|---|---|---|
| ECC | N' | ECC | N |
| 0 0 | 0 | 0 0 | 0 |
| 0 0 | 1 | 0 0 | 0 |
| 0 1 | 0 | 0 0 | 0 |
| 0 1 | 1 | 1 1 | 1 |
| 1 0 | 0 | 0 0 | 0 |
| 1 0 | 1 | 1 1 | 1 |
| 1 1 | 0 | 1 1 | 1 |
| 1 1 | 1 | 1 1 | 1 |

CODING TRANSMISSION EQUIPMENT FOR CARRYING OUT CODING WITH ADAPTIVE QUANTIZATION

This application is a continuation-in-part of co-pending application Ser. No. 879,962, filed on June 30, 1986.

BACKGROUND OF THE INVENTION

1. Field of the Invention

The present invention relates to coding transmission equipment in which an input signal, such as a voice signal or a picture signal, is coded and transmitted to a receiver side from a transmitter side and a received signal is decoded to become an original signal at the receiver side. In particular, the present invention relates to low bit rate coding equipment (bandwidth compression coding equipment), such as an ADPCM (Adaptive Differential Pulse Code Modulation) system CODEC (COder and DECoder), which carries out low bit rate coding of a voice or picture signal.

When the voice signal, etc., is transmitted, bandwidth compression is required to ensure an efficient utilization of a transmission line. The low bit rat coding transmission equipment for the voice signal carries out information compression while maintaining the quality of the voice signal, which enables a reduction of line costs for the transmission of the voice information in equipment used for, for example, mobile radio communication, satellite communication, or office inter communication system, and a reduction of storage capacity needed, for example, for the storage of voice information in an audio response system.

2. Description of the Related Art

ADPCM coding equipment is related to the present invention in that it carries out coding by adaptive quantization. In the ADPCM coding equipment, a prediction error E corresponding to a difference between a current input signal X and a predicted value $\hat{X}$ obtained on the basis of past input signals is produced and quantized at the transmitter side. At this time, adaptive quantization, in which the size of a quantizing step is increased or decreased in accordance with a quantizing level of a signal sampled just prior to the current sampled signal, is carried out in order to realize a quick adaptation to a sudden change of the predicted error, instead of uniform quantization, whereby a high quality recovered signal is realized.

In this case, however, the sizes to which the quantizing step can increased or decreased are limited, and therefore, when the input signals are voice signals, for example, a voiced sound, an unvoiced sound, or a voicelessness, etc., the nature of the signals changes from moment to moment and the coding system of the prior art cannot cope with these rapid variations in the voice signal. As a result, an optimum quantization is not realized, and thus the voice recovered at the receiver side has a poor quality.

SUMMARY OF THE INVENTION

Accordingly, it is an object of the present invention to provide coding transmission equipment which can obtain a high quality recovered signal, for example, a voice signal recovered at a receiver side.

According to a fundamental aspect of the present invention, there is provided coding transmission equipment having a transmitter device and a receiver device wherein, the transmitter device comprises a plurality of adaptive coding units including an adaptive quantizer for outputting a quantized value according to an input signal, and an error calculating unit for calculating the quantization error of the adaptive quantizer, each of the adaptive coding units having different adaptive quantizer processing characteristics; an evaluating unit for deciding which is the optimum adaptive coding unit to carry out an optimum quantization, from among the plurality of adaptive coding units, at every frame of the input signal on the basis of the quantization errors input from the plurality of adaptive coding units respectively; and a sending unit for selecting the optimum quantized value of the optimum adaptive coding unit from among the quantized values input from the plurality of adaptive coding units, respectively, on the basis of the decision of the evaluating unit, and transmitting the optimum quantized value together with the decision information; the receiver device comprises a dividing unit for dividing a signal received from the transmitter device into the optimum quantized value and the decision information; an adaptive decoding unit for decoding the optimum quantized value obtained by the dividing unit into the original input signal; and an optimum controlling unit for controlling the processing characteristic of the adaptive decoding unit to an optimum processing characteristic according to the decision information obtained by the dividing unit.

According to another aspect of the present invention, the transmitter device further comprises a parameter copy unit in which parameters for determining an inner condition of the adaptive coding unit are input from all of the adaptive coding units, and an optimum parameter of the optimum adaptive coding unit is selected and sent to other adaptive coding units at every frame according to the decision of the evaluating unit; wherein each of the other adaptive coding units starts the signal process for a next frame after copying the optimum parameter sent from the parameter copy unit, as an own parameter.

According to still another aspect of the present invention, the transmitter device further comprises an error correction coding unit for carrying out an error correction coding process for the decision information from the evaluating unit, whereby the decision information processed by the error correction coding is sent to the receiver device; and the receiver device further comprises an error correcting unit for carrying out the error correcting process for the decision information obtained by the dividing unit, whereby the error corrected decision information is sent to the optimum controlling unit.

According to a still further aspect of the present invention, the transmitter device further comprises a plurality of adaptive weighting filters each effecting weighting on said quantization error with the same prediction coefficient as said prediction coefficient used in the corresponding one of said adaptive coding units, whereby an additional error signal in which a masking effect is taken into consideration is sent to the evaluation unit.

According to yet another aspect of the present invention, the receiver device further comprises a post-processing filter disposed at a latter stage of tee adaptive decoding unit, wherein the parameter of the post-processing filter is varied according to the parameter of the adaptive decoding unit.

BRIEF DESCRIPTION OF THE DRAWINGS

Examples of coding transmission equipment in accordance with the present invention will be described with reference to the accompanying drawings, in which.

DESCRIPTION OF THE PREFERRED EMBODIMENTS

For a better understanding of the preferred embodiment, the problems in the prior art will be first explained with reference to FIGS. 1 and 2.

Figure 1:
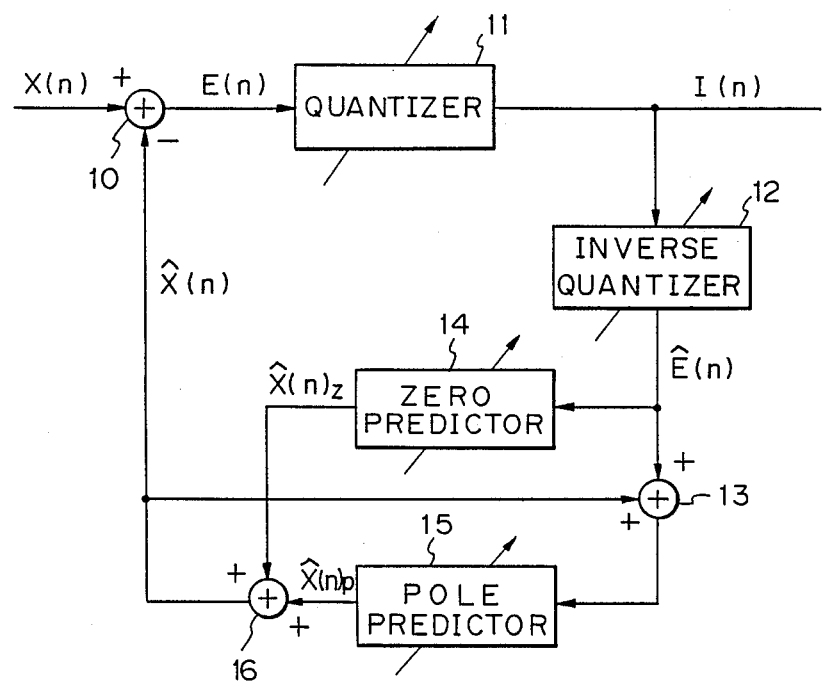
FIG. 1 shows a prior art ADPCM coder.

FIG. 1 shows an adaptive differential coder on the transmitter side in a prior art low bit rate coding transmission equipment for a voice signal. In FIG. 1, the coder comprises a subtractor 10 for calculating a prediction error $E(n)$ corresponding to a difference between an input voice signal $X(n)$ and a predicted value $\hat{X}(n)$ to be output; an adaptive quantizer 11 for adaptive quantizing of the prediction error $E(n)$ to output the quantized value $I(n)$ as a transmission signal; an adaptive inverse quantizer 12 for adaptive inverse quantizing of the quantized value $I(n)$; an adder 13 for adding the inverse quantized value $\hat{E}(n)$ of the prediction error $\hat{E}(n)$ from the inverse quantizer 12 and the predicted value $\hat{X}(n)$; an adaptive zero predictor 14 for producing a zero predicted value $\hat{X}(n)_z$; an adaptive pole predictor 15 for producing a pole predicted value $\hat{X}(n)_p$; and an adder 16 for adding the zero predicted value $\hat{X}(n)_z$ and the pole predicted value $\hat{X}(n)_p$ to produce the predicted value $\hat{X}(n)$.

In this adaptive differential coder, the quantizer 11, the inverse quantizer 12, the zero predictor 14, and the pole predictor 15 are adaptive-controlled. For example, in the quantizer 11 and the inverse quantizer 12, the adaptive quantization wherein the quantizing step size $\Delta(n)$ is updated according to the following formula is carried out.

$$\Delta(n+1)=\Delta(n)^{\gamma}\times M(I(n)) \tag{1}$$

where, $\gamma$ is a coefficient for gradually reducing the influence of the line error, which has a value close to and lower than 1; and $M(I(n))$ is a step size updating coefficient (or a step size updating speed).

When the quantized value $I(n)$ from the quantizer 11 is, for example, a 1 bit output signal, the updating coefficient $M(I(n))$ assumes a value $\alpha$ close to and lower than 1, for example, $\alpha=0.93$, when the quantized value $I(n)$ is "0", and a value $\beta$ close to and higher than 1, for example, $\beta=1.31$, when the quantized value $I(n)$ is "1". Also, when the quantized value $I(n)$ is a plurality bit output signal, the step size updating coefficient $M(I(n))$ is increased in proportion to the increment of the number indicated by the plurality bit output signal.

Figure 2:
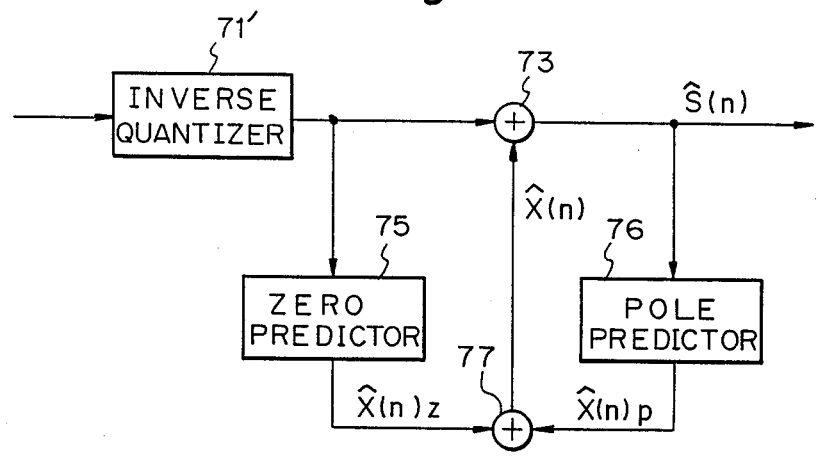
FIG. 2 shows a prior art ADPCM decoder.

FIG. 2 shows an adaptive differential decoder on the receiver side in a prior art low bit rate coding transmission equipment.

In FIG. 2, the decoder comprises an inverse quantizer 71', an adder 73, a zero predictor 75, a pole predictor 76, and an adder 77.

In this decoder, the quantized value $I(n)$ of the prediction error transmitted from the transmitter side is inverse-quantized by the inverse quantizer 71 to recover the prediction error, and the zero predicted value $\hat{X}(n)_z$ and the pole predicted value $\hat{X}(n)_p$ are produced by the zero predictor 75 and the pole predictor 76 on the basis of the recovered past prediction errors respectively. Then, the predicted value $\hat{X}(n)$ obtained by adding this zero predicted value $\hat{X}(n)_z$ and the pole predicted value $\hat{X}(n)_p$ by the adder 73 is added to the inverse-quantized prediction error from the inverse quantizer 71' by the adder 73, to recover the voice signal $\hat{S}(n)$. The processing characteristics of the inverse quantizer 71', the zero predictor 75, and the pole predictor 76 at the receiver side are the same as that of the inverse quantizer 12, the zero predictor 14, and the pole predictor 15 at the transmitter side, respectively.

In the differential coder of FIG. 1, the sep size updating coefficient $M(I(n))$ of the quantizer 11 and the inverse quantizer 12 is a fixed value, since the values $\alpha$ and $\beta$ which determine the updating coefficient $M(I(n))$ are fixed. Therefore, sometimes the optimum quantization is not carried out at the quantizer 11, since updating coefficient $M(I(n))$ of the step size $\Delta(n)$, which is a threshold for quantizing the prediction error $E(n)$, may not sufficiently follow the change of the prediction error $E(n)$.

In particular, when the input signal is a voice signal, the nature of the signal, for example, a voiced sound, unvoiced sound, or silence, changes from moment to moment and frequently varies, and therefore, the optimum quantization is not carried out since the fixed step size updating coefficient $M(I(n))$ cannot follow the change of the voice signal.

Figure 4:
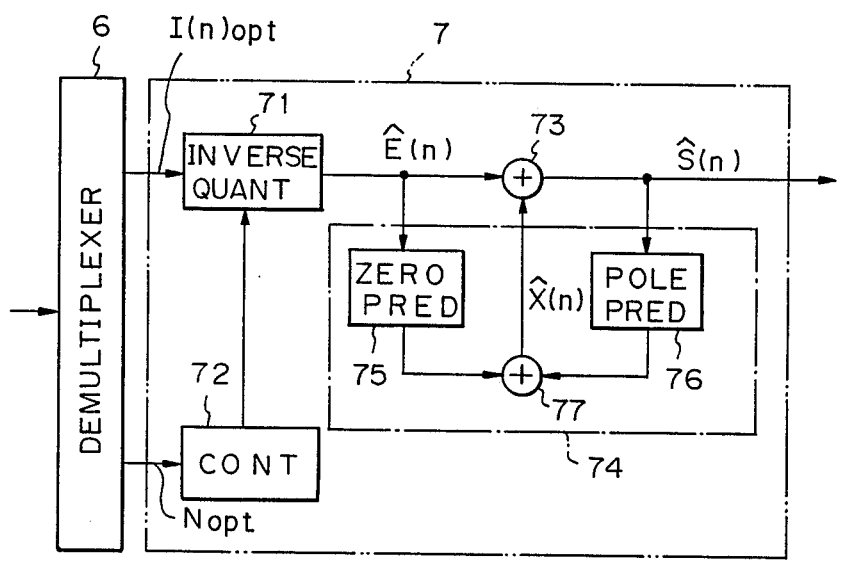
FIG. 4 shows an embodiment of an ADPCM decoder at a receiver side of the coding transmission equipment according to the present invention.
Figure 3:
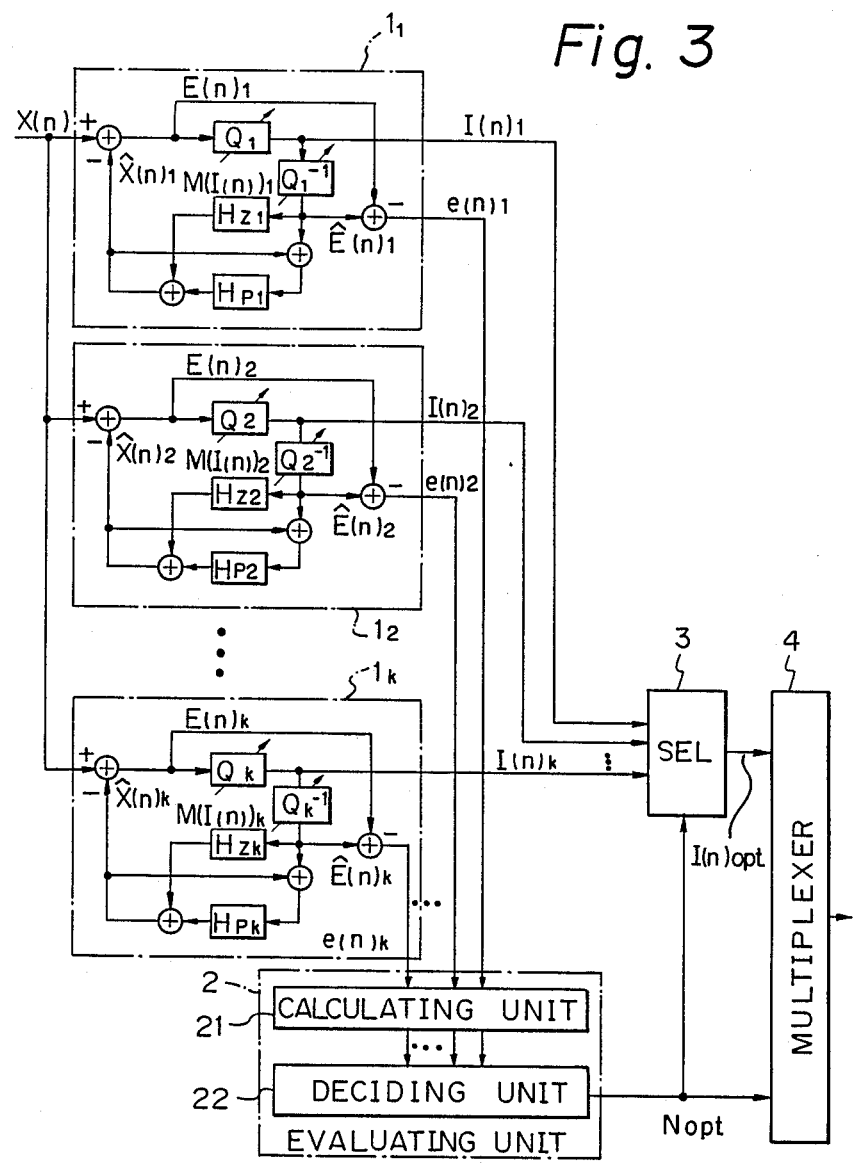
FIG. 3 shows an embodiment of an ADPCM decoder at a receiver side of the coding transmission equipment according to the present invention.
Figure 5:
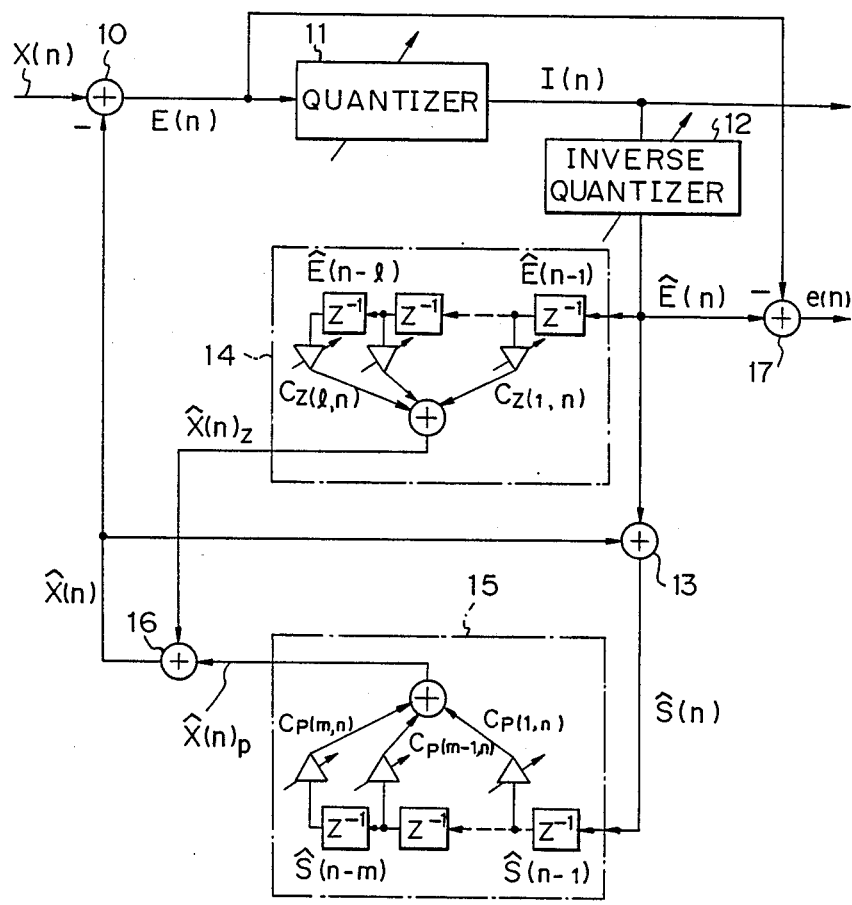
FIG. 5 shows an adaptive differential coding unit of the ADPCM coder of FIG. 3 in more detail.

A preferred embodiment of the present invention will now be explained wit reference to FIGS. 3 to 5. FIGS. 3 to 5 show an embodiment of the coding transmission equipment, according to the present invention, which is adapted to transmission equipment using the ADPCM coding system. FIG. 3 shows an ADPCM coder at the transmitter side, and FIG. 4 shows an ADPCM decoder at the receiver side.

In FIG. 3, $1_1$ to $1_k$ are the k numbers of adaptive differential coding units in which the step size updating coefficients $M(I(n))_1$ to $M(I(n))_k$ of quantizers (in more detail, values $\alpha$ and $\beta$ described above) are different, respectively. The fundamental structure is the same as the adaptive differential coder shown in FIG. 1, except that a subtractor is provided which calculates and outputs a quantization error e(n) corresponding to a differential value between prediction error E(n) and the inverse-quantized value of the prediction error $\hat{E}(n)$ from the inverse quantizer 12.

FIG. 5 shows a more detailed structure of one of the adaptive differential coding units $1_1$ to $1_k$. In FIG. 5, the subtractor 10 calculates the prediction error E(n) corresponding to the differential value between the input voice signal X(n) and the predicted value $\hat{X}(n)$ and sends this prediction error E(n) to the adaptive quantizer 11. The adaptive quantizer 11 quantizes the prediction error E(n) and outputs a quantized value I(n). This quantized value I(n) is introduced to the inverse quantizer 12, which carries out the inverse quantization. At the same time, the quantized value I(n) is transmitted to the receiver side. The inverse quantized value $\hat{E}(n)$ of the prediction error E(n) from the inverse quantizer 12 is introduced to the zero predictor 14 and the subtractor 17, and to the pole predictor 15 via the adder 13. The predictor 14 produces a zero predicted value $\hat{X}(n)_z$, and the pole predictor 15 produces a pole predicted value $\hat{X}(n)_p$. The zero predicted value $\hat{X}(n)_z$ and the pole predicted value $\hat{X}(n)_p$ are added by the adder 16 to produce a predicted value $\hat{X}(n)$, which is then sent to the subtractor 10. The subtractor 17 calculates the differential value between the prediction error E(n) and the inverse quantized value $\hat{E}(n)$ thereof, and outputs the result as a quantization error e(n).

The quantizer 11 and the inverse quantizer 12 are adaptive controlled type devices, and the quantizing step size $\Delta(n)$ is updated by the quantizing step adapter (not shown) according to the formula (1) described previously. This quantizing step size $\Delta(n)$ is a parameter for deciding inner conditions of the quantizer 11 and the inverse quantizer 12.

The zero predictor 14 and the pole predictor 15 are also adaptive control type devices, and are constituted by circuits comprising taps (time delay elements) and coefficient multipliers, having the orders 1 and m, respectively. The zero predictor 14 and the pole predictor 15 hold prediction coefficients updated in sequence, and from the viewpoint of the transfer function as a filter, hold tap data containing past records.

That is, in the zero predictor 14, zero prediction coefficients $C_z(1,n) \sim C_z(l, n)$ of each coefficient multiplier are updated by the prediction coefficient adapter (not shown) according to the following formula, respectively.

$$C_z(i, n+1) = L_z \times C_z(i, n) + D_z \times \text{sgn}(\hat{E}(n)) \times \text{sgn}(\hat{E}(n-i)) \qquad (2)$$

where, $L_z$ and $D_z$ are constant, and sgn( ) is a signature function which indicates a signature of "+" or "−".

The zero prediction coefficients $C_z(1, n)$ to $C_z(l, n)$ and tap data E(n−1) to E(n−1) stored at each tap are parameters for determining the inner condition of the zero predictor 14.

Also, in the pole predictor 15, pole prediction coefficients $C_p(1, n)$ to $C_p(m, n)$ of each coefficient multiplier are updated by the prediction coefficient adapter (not shown) according to the following formula, respectively.

$$C_p(i, n+1) = L_p \times C_p(i, n) + D_p \times \text{sgn}(\hat{E}(n)) \times \text{sgn}(S(n-i)) \qquad (3)$$

where, $L_p$ and $D_p$ are constant.

The pole prediction coefficients $C_p(1, n)$ to $C_p(m, n)$ and tap data S(n−1) to S(n−m) stored at each tap are the parameters for determining the inner condition of the pole predictor 15.

In FIG. 3, each component of FIG. 5 is represented in such a manner that the quantizer 11 is represented by $Q_1$ to $Q_k$, the inverse quantizer 12 by $Q_1^{-1}$ to $Q_k^{-1}$, the zero predictor 14 by $H_{z1}$ to $H_{zk}$, and the pole predictor 15 by $H_{p1}$ to $H_{pk}$, respectively.

In FIG. 3, quantization errors $e(n)_1$ to $e(n)_k$ are introduced to an evaluating unit 2. The evaluating unit 2 comprises a quantization error power calculating unit 21 and an optimum quantization deciding unit 22. The calculating unit 21 calculates powers of the quantization errors $e(n)_1$ to $e(n)_k$, sample by sample respectively, during one frame of the voice signal X(n) (for example, 16 samples), and integrates them, respectively, at each frame, then outputs the summed powers of each of the quantization errors $e(n)_1$ to $e(n)_k$ at the end of the frame to the deciding unit 22. The deciding unit 22 decides the optimum coding unit 1 opt, which carries out the optimum quantization, among the adaptive differential coding units $1_1$ to $1_k$, by selecting the minimum calculated quantization error power from that of the quantization errors $e(n)_1$ to $e(n)_k$. Then, the deciding unit 22 outputs an optimum coder number signal Nopt, indicating the number of the optimum coding unit 1 opt decided as aforementioned, to a selector 3 and a multiplexer 4.

The quantized values $I(n)_1$ to $I(n)_k$ from adaptive differential coding units $1_1$ to $1_k$ are introduced to the selector 3, respectively. This selector is constituted by a memory such as a RAM, which can store quantized values $I(n)_1$ to $I(n)_k$ of one frame. When the coder number signal Nopt is received at the end of one frame, the selector 3 sends one frame of the optimum quantized value $I(n)_{opt}$ of the optimum coding unit 1 opt, which is selected by using the coder number signal Nopt, as an address to the multiplexer 4. The multiplexer 4 adds the coder number signal Nopt from the evaluating unit to the optimum quantized value I(n)opt, and transmits a multiplexed signal to the receiver side after converting the signal to a transmission line code.

In the receiver of FIG. 4, 6 is a demultiplexer, and 7 a decoder. The decoder 7 comprises an adaptive inverse quantizer 71; a controller 72 capable of controlling the step size updating coefficient M(I(n)) of the inverse quantizer 71; a adaptive predictor 74 constituted by a zero predictor 75, a pole predictor 76, and an adder 77; and an adder 73.

The operation of the above described coding transmission equipment is explained hereinafter.

The voice signal X(n) is input to each of adaptive differential coding units $1_1$ to $1_k$ in parallel, an adaptive differential coding process is carried out at each unit, and the quantized values $I(n)_1$ to $I(n)_k$ and the quantization errors $e(n)_1$ to $e(n)_k$ are output. The quantization error power calculating unit 21 calculates the power of the input quantization errors $e(n)_1$ to $e(n)_k$ frame by frame,, respectively, then sends the calculated results to the optimum quantization deciding unit 22. The deciding unit 22 decides the optimum coding unit 1 opt for outputting the quantization error e(n), having a minimum quantization error power, which carries out the optimum quantization and then sends the coder number signal Nopt indicating the coder number of the decided optimum coding unit 1 opt to the selector 3 and the multiplexer 4.

In response to this coder number signal Nopt, the selector 3 sends one frame of the optimum quantized value I(n)opt of the optimum coding unit 1 opt indicated by the coder number signal Nopt to the multiplexer 4. The multiplexer 4 adds the coder number signal Nopt to the optimum quantized value I(n)opt and transmits the multiplexed signal to the receiver side.

In the receiver side, the received signal is divided into the quantized value I(n)opt of the prediction error E(n) and the coder number signal Nopt, and input to the inverse quantizer 71 and the controller 72, respectively. The inverse quantizer 71 inverse-quantizes the quantized value I(n)opt to obtain the original prediction error $\hat{E}(n)$, then sends the prediction error $\hat{E}(n)$ to the adder 73. The adder 73 adds the inverse-quantized prediction error $\hat{E}(n)$ and the predicted value $\hat{X}(n)$ predicted y the predictor 74 on the basis of past recovered voice signals to recover the current voice signal $\hat{S}(n)$. The predictor 74 carries out the adaptive prediction according to the output signal of the inverse quantizer 71.

On the other hand, the controller 72 controls the step size updating coefficient M(i(n)) of the inverse quantizer 71 to coincide with the step size updating coefficient M(I(n))opt of the optimum coding unit 1 opt selected as the coding unit carrying out the optimum quantization for a relevant frame at the transmitter side. That is, the controller 72 reads out the step size updating coefficient M(I(n)) from a ROM by using the coder number signal Nopt as an address, then sends it to the inverse quantizer 71, and an inverse quantization step adapter in the inverse quantizer 71 changes the updating coefficient M(I(n)).

As described above, in the coding transmission equipment of the present invention, the coder of the transmitter side selects the optimum coding unit which carries out the optimum quantization from among a plurality of adaptive differential coding units having different step size updating coefficients, then transmits the quantized value thereof with the coding unit number, and the decoder of the receiver side recovers the original voice signal from the received quantized value by using the optimum step size updating coefficient indicated by the received coding unit number, whereby an improvement of the quantity of the recovered voice signal is achieved.

Although a preferred embodiment has been described heretofore, various modifications and alterations are possible within the scope of the present invention.

For example, means for changing the optimum updating coefficient M(I(n)) in accordance with the received coder number signal Nopt at the receiver side is not limited to the above described example. The receiver can have a plurality of inverse quantizers having different step size updating coefficients corresponding to those of the transmitter side, and can recover the voice signal by selecting the optimum inverse quantizer by the selector according to the received coder number signal. Also the receiver can have a plurality of decoders having difference processing characteristics corresponding to each coding unit at the transmitter side, and can select the optimum decoder according to the received coder number signal.

Figure 6:
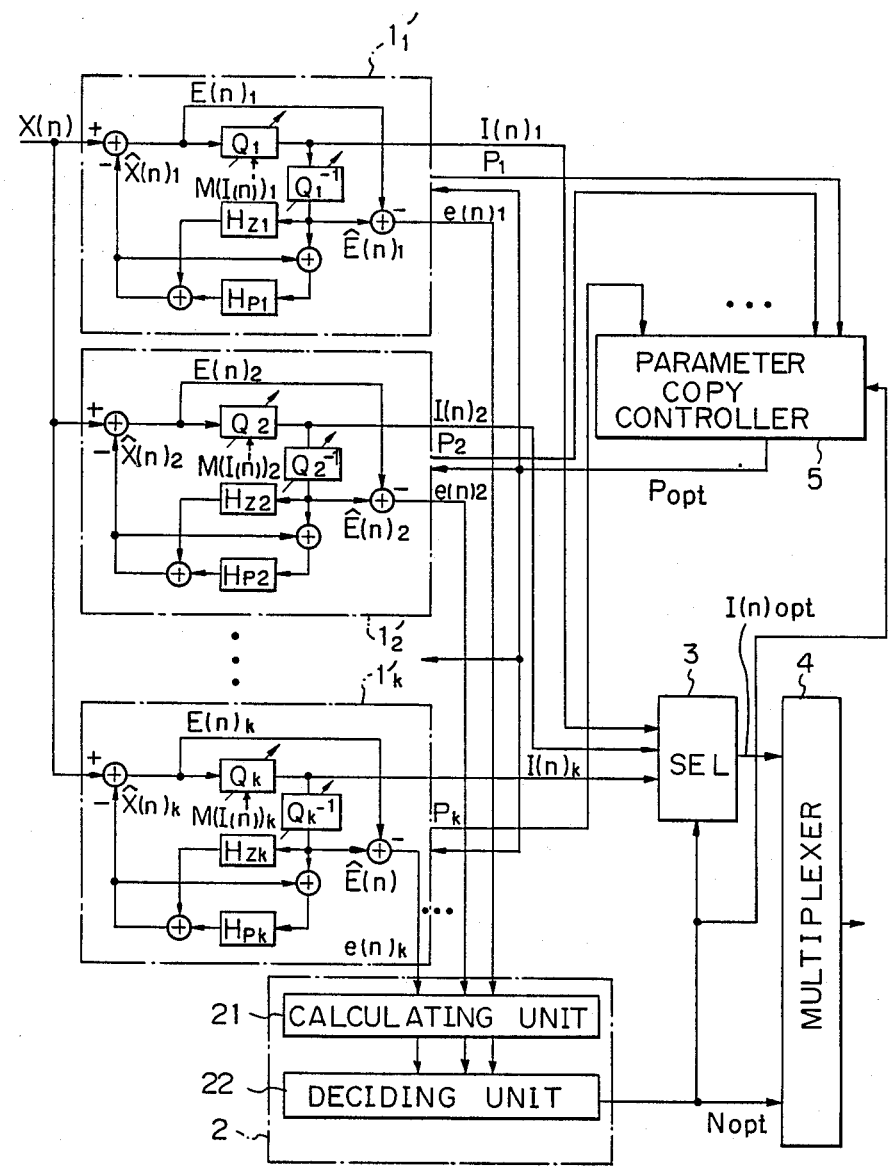
FIG. 6 shows another embodiment of the ADPCM coder according to the present invention.

FIG. 6 shows another embodiment of the coder according to the present invention. This coder is improved so that a better quality recovered voice signal is obtained at the receiver side in comparison with the coder of FIG. 3.

The quantizer, the inverse quantizer, the zero predictor, and the pole predictor in each adaptive differential coder $1_1$ to $1_k$ are adaptive controlled, and therefore, the parameters deciding the inner condition of the coding unit, for example, the quantization step size Δ(n) of the quantizer and the inverse quantizer and the prediction coefficient and tap data of the predictor, etc., vary successively at each of the differential coding units $1_1$ to $1_k$ according to the processing procedure of the input signal, and become different at each differential coding unit.

Accordingly, when the prior selected differential coding unit is changed to the other differential coding unit currently selected at a boundary between frames, in order to select the optimum differential coding unit, the aforementioned parameter of the prior selected coding unit and that of the currently selected coding unit are different. As a result, when the differential coding unit is switched, a discontinuity in the process of the input signal arises at the boundary between frames due to the difference between these parameters, therefore the discontinuity of the recovered signal also arises at the boundary between frames in the receiver side, and thus the recovered voice has a poor quality. The coder shown in FIG. 6 is intended to solve this problem.

The difference between the coder of FIG. 6 and the coder of FIG. 3 is that the coder of FIG. 6 is provided with a parameter copy controller 6. That is, parameters $P_1$ to $P_k$ from the differential coding units $1_1'$ to $1_k'$, which parameters determine the inner condition of the coding unit, and the coder number signal Nopt from the evaluating unit 2 are input to the parameter copy controller 6. Here, parameters $P_1$ to $P_k$ are quantizing step sizes $\Delta(n)_1$ to $\Delta(n)_k$, zero prediction coefficients $C_{z1}$ to $C_{zk}$, pole prediction coefficients $C_{p1}$ to $C_{pk}$, tap data $E_1$ to $E_k$, and tap data $S_1$ to $S_k$. The parameter copy controller 5 selects the parameter Popt of the optimum coding unit 1 opt according to the coder number signal Nopt and then sends it to all of the differential coding units $1_1'$ to $1_k'$.

The operation of the coder shown in FIG. 6 will be explained below.

The optimum coding unit 1 opt is decided by the evaluating unit at the end of one frame of the voice signal X(n), and then the coder number signal Nopt is sent to the selector 3, the multiplexer 4, and the parameter copy controller 5. The selector 3 sends one frame of the quantized value I(n)opt of the optimum coding unit 1 opt indicated by the signal Nopt to the multiplexer 4, and the multiplexer 4 then transmits this optimum quantized value I(n)opt with the coder number signal Nopt to the receiver side.

On the other hand, the parameter copy controller 5 selects the optimum parameter Popt of the optimum coding unit 1 opt corresponding to the coder number signal Nopt from among the input parameters $P_1$ to $P_k$, and then sends that parameter Popt to all of the differential coding units $1_1'$ to $1_k'$. Accordingly, all of the adaptive differential coding units copy the received optimum parameter Popt as an own parameter at the end of one frame.

That is, at each adaptive differential coding unit, the quantizing step size $\Delta(n)$opt is written in the quantizer 11 and the inverse quantizer 12, the zero prediction coefficient Cz·opt and the tap data Eopt are written in the coefficient multiplier of the zero predictor 14 and the tap thereof, respectively, and the pole prediction coefficient Cp·opt and the tap data Sopt are written in the coefficient multiplier of the pole predictor 15 and the tap thereof, respectively.

As a result, all of the adaptive differential coding units $1_1'$ to $1_k'$ have the same inner condition as that of the currently selected adaptive differential coding unit $1'$ opt at the time of starting the next frame. Accordingly, when, for example, the adaptive differential coding unit $1_1'$ is selected as the optimum coding unit at current frame and then the adaptive differential coding unit $1_2'$ is selected at next frame, the parameter $P_1$ of the differential coding unit $1_1'$ at the end point of the current frame coincides with the parameter $P_2$ of the differential coding unit $1_2'$ at the starting point of the next frame, and therefore, no discontinuity arises at the boundary between the current and next frames.

Figure 7:
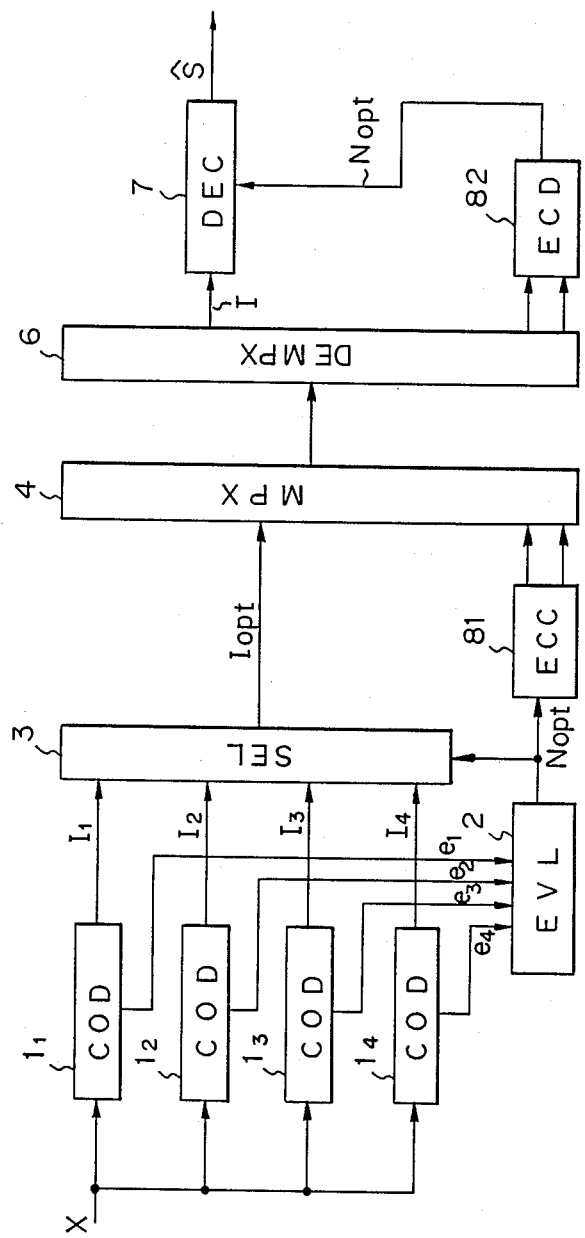
FIG. 7 shows a further embodiment of the coding transmission equipment according to the present invention.

FIG. 7 shows a further embodiment of the present invention. In the coding transmission equipment shown in FIGS. 3 to 6, if the coder number signal Nopt indicating the optimum coding unit number is erroneous, the influence of the error extends over several frames, and thus the recovered voice at the receiver side has a poor quality. The equipment of FIG. 7 is intended to solve this problem.

That is, the transmission equipment of FIG. 7 is provided with an error correction circuit for correcting the error arising in the transmitted optimum coder number signal Nopt.

In FIG. 7, the coder number signal from the evaluating unit 2 is input to the multiplexer 4 via an error correcting coder 81, and then transmitted to the receiver side. On the other hand, at the receiver side, the coder number signal Nopt divided by the demultiplexer 6 is input, via an error correcting decoder 82, to the decoder 7, wherein the signal Nopt is input to the controller 72 as shown in FIG. 4 for controlling the updating coefficient $M(I(n))$ of the inverse quantizer. The error correcting coder 81 and the error correcting decoder 82 carry out the error correction as follows.

Figures 8, 9, 10:
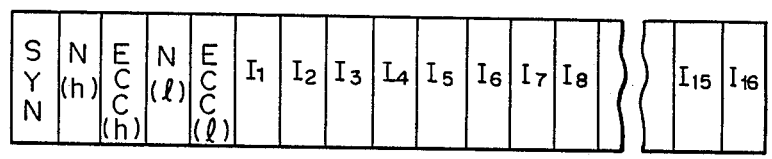
FIG. 8 shows an example of an error correcting code.
FIG. 9 shows a format of the transmission signal including the error correcting code.
FIG. 10 shows an example of an error correction at the receiver side.

First, in this example, the number of differential coding units is four, and each coding unit is given the coder numbers "00", "01", "10", and "11". FIG. 8 shows an example of an error coding code, FIG. 9 shows a format of one frame of the transmission signal, and FIG. 10 shows an example of an error correction at the receiver side.

As shown in FIG. 8 the error correcting code ECC is obtained by converting "0" and "1" of each digit of the coder number into "00" and "11" respectively. The transmission code is configured by arranging the high order digit error correcting code ECC(h) of the coder number, the high order digit N(h) thereof, the low order digit error correcting code ECC(l) the coder number, and the low order digit N(l) thereof, in sequence. Therefore, the coder number constituted by two digits is converted into the transmission code constituted by six digits and transmitted to the receiver side.

In the receiver side, the error correcting decoder 82 decides whether each of the high and low order digits of the received transmission code is "0" or "1" by a majority of "0" and "1" thereof, and corrects all digits of each of the high and low order digit of the received transmission code to "000" or "111" according to the majority decision, thereby recovering the correct high and low order of the digits of the coder number.

For example, FIG. 10 shows the error correction of high order digits of the received transmission code at the receiver side. As shown in FIG. 10, "001", "010", and "100" of the high order digits wherein "1" may be erroneous are corrected to "000". Also, "011", "101", and "110" wherein "0" may be erroneous are corrected to "111".

Various kinds of error correcting codes are known, and a suitable error correcting code may be adopted according to the number of differential coding units and kind of coder number to be transmitted, etc.

Assuming that a sampling frequency of the input voice signal is 6.4 kHz, and the quantized value code of the prediction error is 2 bits at each sample point, an example of a bit allocation of the frame which transmits the quantized value codes of 16 sample points will be explained below.

One frame is constituted by 39 bits wherein 32 bit are the quantized value codes, each of which is 2 bits of 16 samples, 2 bits are the coder number, and 4 bits are error correcting codes ECC(h) & ECC(l). Each frame is transmitted during 2.5 ms (=1/400 sec) corresponding to a 16 sample period at a sampling frequency of 6.4 kHz, therefore the transmission rate is 15.6 Kbit/sec.

Figure 11:
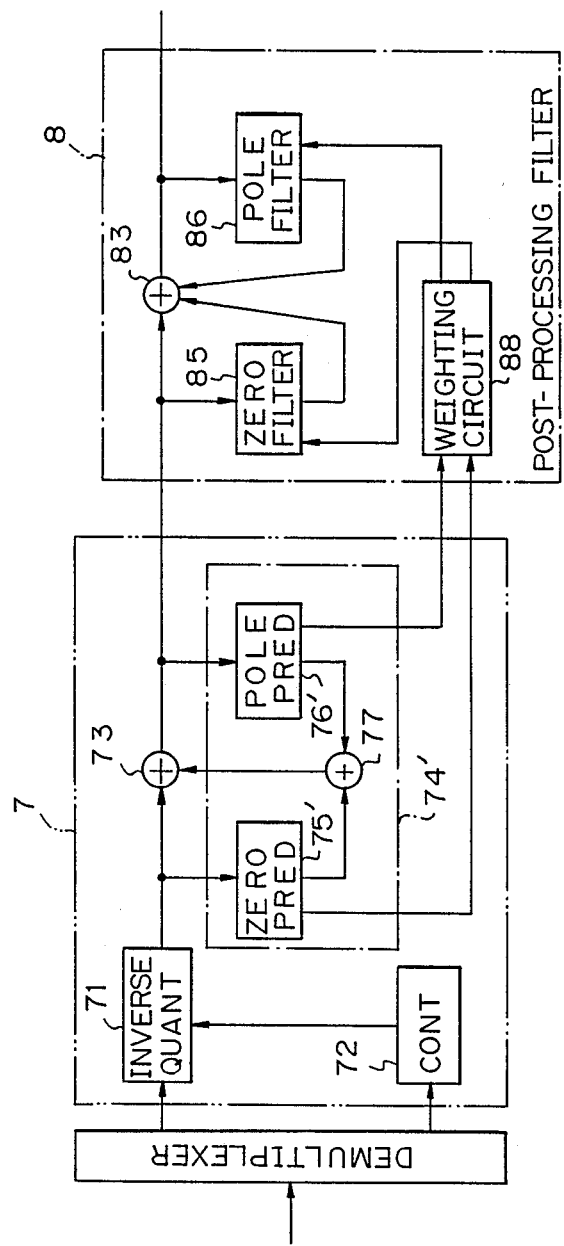
FIG. 11 shows still another embodiment of the ADPCM decoder at the receiver side according to the present invention.

FIG. 11 shows still another embodiment of the receiver side of the coding transmission equipment according to the present invention. The difference between the embodiment of FIG. 5 and this embodiment of FIG. 11 is that here a post-processing filter is provided. The post-processing filter carries out the signal process of the decoded signal in order to improve an auditory sense of the recovered voice. This postprocessing filter is disclosed in a paper entitled "Enhancement of ADPCM Speech by Adaptive Post-filtering" by V. Ramamoorthy & N. S. Jayant, published at the "ICC '85" held in the USA. According to this paper, when a transfer function A(z) of the pole predictor 76 of the predictor 74 and a transfer function B(z) of the zero predictor 75 thereof are as follows, $$A(z) = \sum_{j=1}^{2} a_j z^{-j}$$

$$B(z) = \sum_{j=1}^{6} b_j z^{-j}$$

a transfer function A'(z) of a pole post-processing filter 86 of the post-processing filter 8 and a transfer function B'(z) of a zero post-processing fitter 85 is assumed to be as follows.

$$A'(z) = \sum_{j=1}^{2} a^j \cdot a_j z^{-j}$$

$$B'(z) = \sum_{j=1}^{6} \beta^j \cdot b_j z^{-j}$$

$$(0 \leq \alpha \leq 1, 0 \leq \beta \leq 1)$$

Figure 12:
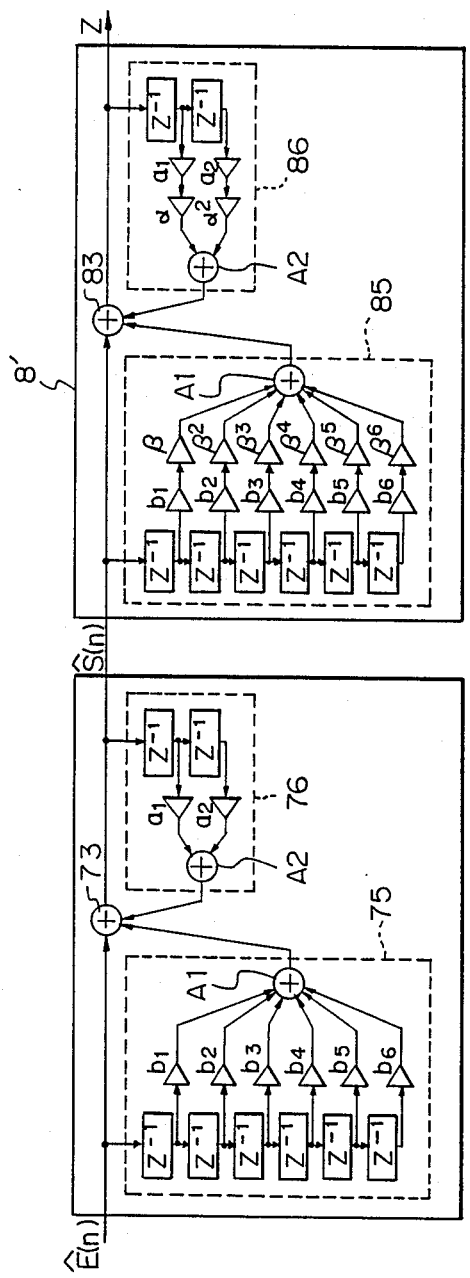
FIG. 12 is a view for explaining a post-processing filter in detail.

The principal structure of the predictor 74 and the post-processing filter 8 disclosed in this paper is shown in FIG. 12. In FIG. 12, the reference symbols of the coefficient multipliers denote the coefficients thereof, respectively, for simplification of the explanation.

The predictor of the decoder 7 shown at left side of FIG. 12 comprises the zero predictor 75 including six time delay elements $Z^{-1}$, six coefficient multipliers $b_1$ to $b_6$, and an adder A1 adding output signals of multipliers $b_1$ to $b_6$, which realizes the transfer function B(z), and the pole predictor 76 comprising two time delay elements $Z^{-1}$, two coefficient multipliers $a_1$ and $a_2$, and an adder A2 adding output signals of the multipliers $a_1$ and $a_2$, which realizes the transfer function A(z). Output signals of the zero predictor 75 and the pole predictor 76 are added to the signal E(n) obtained by inverse quantizing the quantized value from the transmitter side at the inverse quantizer 71 (FIG. 11) by the adder 73, to obtain the recovered voice signal S(n).

A block at the right side in FIG. 12 is a post-processing filter 8', which comprises a zero post-processing filter 85, a pole post-processing filter 86, and an adder 83. The zero post-processing filter 85 is further provided with $\beta$ coefficient multipliers $\beta$ and $\beta^2$ to $\beta^6$ inserted between coefficient multipliers $b_1$ to $b_2$ and the adder A1, respectively, in comparison with the zero predictor 75 in order to carry out the operation of $\beta$ coefficient which is a power of $\beta$.

The pole post-processing filter is provided with $\alpha$ coefficient multiplier $\alpha$ and $\alpha^2$ inserted between coefficient multipliers $a_1$ and $a_2$ and the adder A2, respectively, in comparison with the pole predictor 76. Output signals of post-processing filters 85 and 86 are added to the recovered voice output $\hat{S}(n)$ at the adder 83, whereby the auditory sense of the recovered output is improved, and then output as an improved output Z.

The aforementioned coefficients $b_1$ to $b_6$, $a_1$ and $a_2$ are updated to adapt to the input signal, and must have the same values at the predictor and the post-processing filter. Also, the coefficients $\alpha$ and $\beta$ at the post-processing filter are updated to adapt to the input signal.

In FIG. 11, the post-processing filter 8, such as the filter shown in FIG. 12, is disposed at the output side of the decoder 7. This post-processing filter 8 is provided with a coefficient weighting circuit 88 for controlling the coefficients $\alpha$ and $\beta$ of the zero and pole post-processing filters 85 and 86.

The coefficients of the coefficients multipliers $b_1$ to $b_6$ of the zero post-processing filter 85 and the coefficient multipliers $a_1$ and $a_2$ of the pole post-processing filter 86 are kept at the same values as those of the coefficients $b_1$ to $b_6$ of the zero predictor 75' and coefficients $a_1$ and $a_2$ of the pole predictor 76', respectively, by the coefficient weighting circuit 88. Also, the power coefficient $\beta$ of the zero post-processing filter 85 and the power coefficient $\alpha$ of the pole post-processing filter 86 are adjusted to suitable values for carrying out a suitable post-processing by the coefficient weighting circuit 88. The coefficients $\alpha$ and $\beta$ are set to a value between 0 to 1. Note in this example, $\alpha$ is 1.0 and $\beta$ is 0.2.

As described above, the recovered voice output having a further improved quality can be obtained by adding the post-processing filter having a characteristic which is changed according to the characteristic of the adaptive differential coding unit at the transmitter side.

In the above-described embodiments of the present invention, the coding transmission equipment has a plurality of adaptive quantizers with different step size updating coefficients, and the plurality of adaptive quantizers are operated in parallel in response to input signals. An optimum quantizer is selected each time a frame of data is received, to minimize the power of the error signal, that is, a quantization error signal, resulting in an improvement in the characteristics by the switching operation, whereby, from a view point of a signal to noise ratio (S/N), the reproduced signal can be said to be the signal most similar to the input signal, as a wave.

Figure 13:
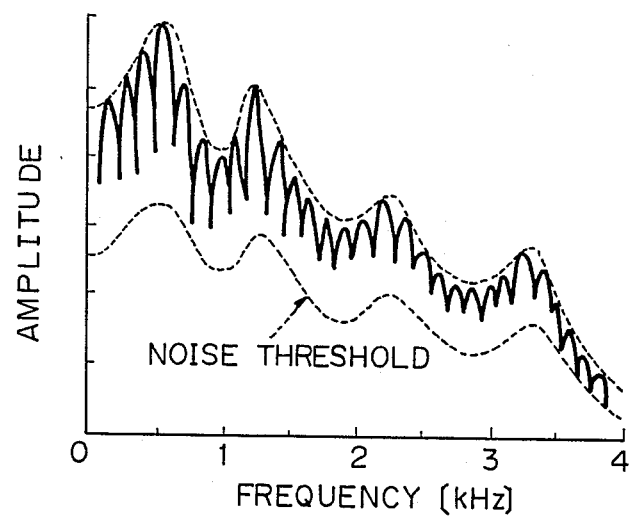
FIG. 13 is a graph showing the relationship between the noise threshold and the signal amplitude.

When a hearing characteristic is taken into account, a masking effect is well known in the art. By the masking effect, when the amplitude of the signal power is relatively large, the power of the error signal, i.e., noise, is masked so that the signal is not aurally deteriorated. In other words, as shown in FIG. 13, the noise threshold may be relatively high when the signal amplitude is high, and the noise threshold is relatively low when the signal amplitude is relatively small.

Since the already described embodiments do not take the masking effect of the noise component into account they cannot always provide an optimumly reproduced sound signal, from the view point of aural clarity.

Now, still further embodiments of the coding transmission equipment will be described in the following, in which the masking effect is taken into account so that, from the view point of the aural clarity, the coding transmission equipment can reproduce a voice signal with a high fidelity to the original sound and which is more natural.

Figure 14:
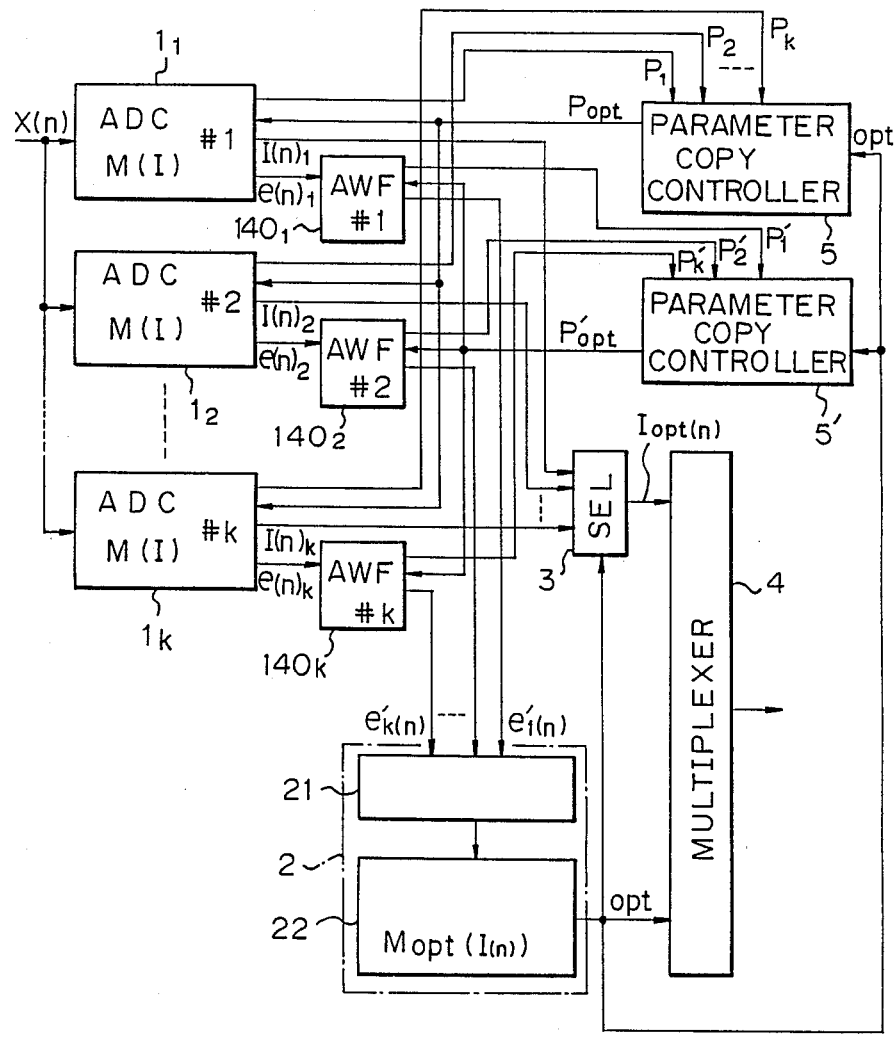
FIG. 14 shows still another embodiment of the ADPCM coder according to the present invention.

FIG. 14 shows an embodiment of the present invention in which the masking effect is taken into consideration.

The main difference between FIG. 14 and FIG. 6 is that, in FIG. 14, adaptive weighting filters (AWF) $140_1$ to $140_K$ are respectively provided between the adaptive differential coding units $1_1$ to $1_K$, and the evaluating unit 2, and an additional parameter copy controller 5' is provided between the adaptive weighting filters $140_1$ to $140_K$ and the evaluating unit 2. The other portions ar substantially the same as the portions shown in FIG. 6, and are denoted by the same reference numbers or symbols.

In each of the adaptive weighting filters $140_1$ to $140_K$, in order to take into account the hearing characteristic, weighting is effected on the same prediction coefficients as those of the adaptive differential coding units $1_1$ to $1_K$. Upon selection of one of the adaptive differential coding units $1_1$ to $1_K$, the calculating unit 2 calculates powers of additional quantization errors $e'(n)_1$ to $e'(n)_K$ which are output from the adaptive weighting filters $140_1$ to $140_K$ sample by sample respectively, in a way similar to that described with reference to FIG. 6. The construction and operation of the deciding unit 22 are the same as those described with reference to FIG. 6.

The additional parameter copy controller 5' receives the coder number signal $N_{opt}$ from the evaluation unit 2, and receives additional parameters $P_1'$ to $P_K'$ from the adaptive weighting filters $140_1$ to $140_K$, respectively. The additional parameters $P_1'$ to $P_K'$ are those determining the internal conditions of the adaptive weighting filters $140_1$ to $140_K$. In response to the coder number signal $N_{opt}$, the additional parameter copy controller 5' selects an additional optimum parameter P'opt from among the additional parameters $P_1'$ to $P_K'$. The selected parameter $P'_{opt}$ is sent to all of the adaptive weighting filters $140_1$ to $140_K$, to initialize the internal conditions thereof for the next frame.

The constitution and operation of the parameter copy controller 5 are the same as those described with reference to FIG. 6.

Figure 15:
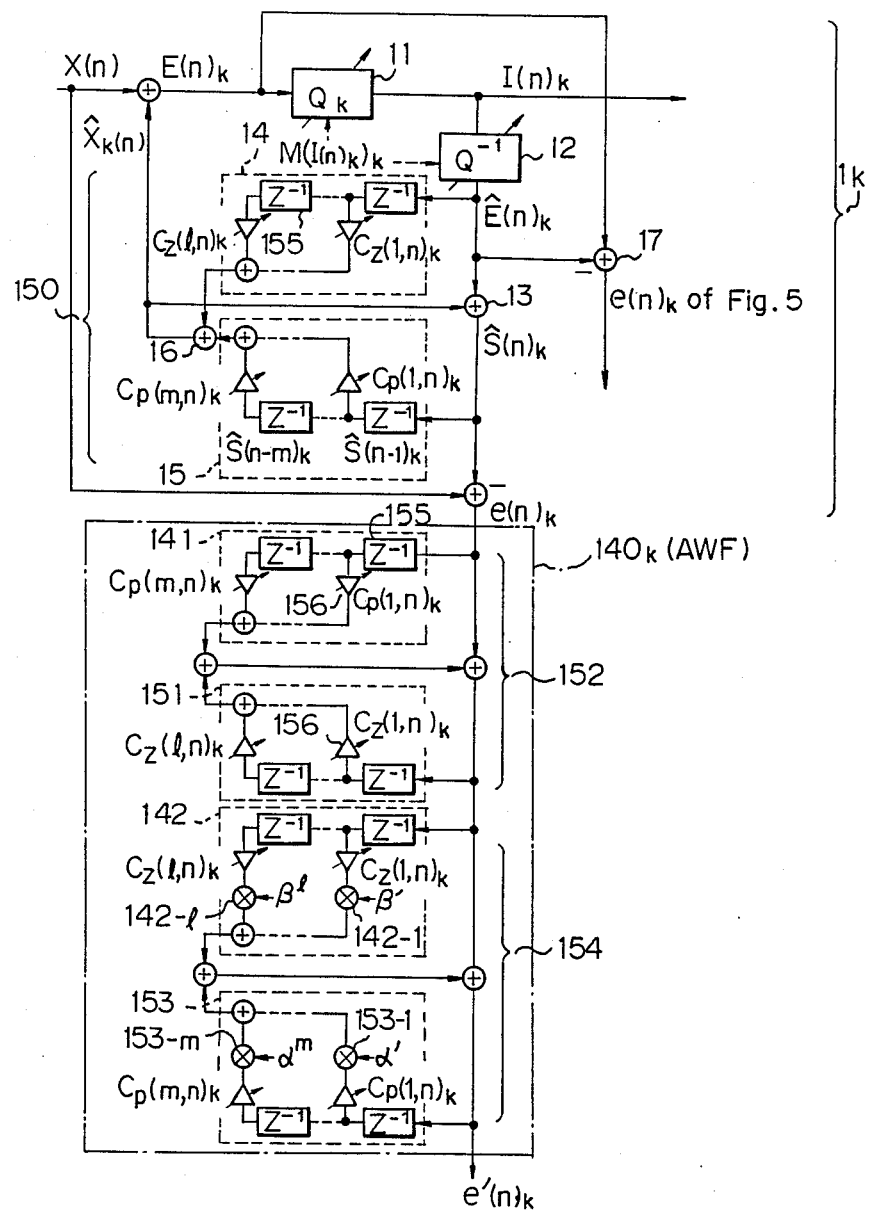
FIG. 15 shows an embodiment of a detailed construction of a part of the ADPCM coder shown in FIG. 14.

FIG. 15 shows a detailed construction of the adaptive differential coding unit $1_K$ and the adaptive weighting filter $140_K$ shown in FIG. 14.

In FIG. 15, the construction of the adaptive differential coding unit $1_K$ is the same as that shown in FIG. 5. Therefore, a description of the unit $1_K$ is omitted here.

The error signal $e(n)_K$ is a signal obtained by subtracting the locally reproduced signal $S(n)_K$, which corresponds to reproduced output, from the input signal $X(n)$. This error signal $e(n)K$ is input to the adaptive weighting filter $140_K$, according to this embodiment, to obtain the additional error signal $e'(n)_K$ in which the hearing characteristic is taken into account. The adaptive weighting filter $140_K$ includes a zero predictor 141 and a pole detector 151. The tap coefficients $C_P(1,n)_K$ to $C_P(m,n)K$ of coefficient multipliers in the zero predictor 141 are the same as those in the pole detector 15 in the adaptive differential coding unit $1_K$. The tap coefficients $C_Z(1,n)_K$ to $C_Z(1,n)_K$ of the coefficient multipliers in the pole predictor 151 are the same as those in the zero predictor 14 in the adaptive differential coding unit $1_K$. Therefore, an adaptive prediction filter 152 consisting of the zero predictor 141 and the pole predictor 151 has an inverse characteristic when compared with the characteristic of the adaptive prediction filter 150 consisting of the zero predictor 14 and the pole predictor 15 in the adaptive differential coding unit $1_K$.

The adaptive weighting filter $140_K$ further includes a zero predicting filter 142 and a pole predicting filter 153. The filters 142 and 153 constitute a weighting filter 154 of the adaptive weighting filter $140_K$. The zero predicting filter 142 has the same tap coefficients $C_Z(1,n)_K$ to $C_Z(l,n)_K$ as those in the zero predictor 14. The zero predicting filter 142 further includes additional multipliers 142-1 to 142-l in which constant weighting coefficients $\beta_1$ to $\beta_l$ are multiplied to the outputs of the multipliers of the tap coefficients $C_Z(1,n)_K$ to $C_Z(l,n)_K$, respectively. Similarly, the pole predicting filter 153 has the same tap coefficients $C_P(1,n)_K$ to $C_P(m,n)_K$ as those in the pole predictor 15. The pole predicting filter 153 further includes additional multipliers 153-1 to 153-m in which constant weighting coefficients $\alpha_1$ to $\alpha_m$ are multiplied to the outputs of the multipliers of the tap coefficients $C_P(1,n)_K$ to $C_P(1,m)_K$, respectively. Note that, in FIG. 15, 155 represents delay circuits; and 156 represents the multipliers of the tap coefficients $C_Z(1,n)K$ to $C_Z(1,n)_K$ or $C_P(1,n)_K$ to $C_P(m,n)_K$. The transmission characteristic H(z) of the adaptive prediction filter 150 is expressed as:

$$H(Z) = \frac{1 + B(Z)}{1 - A(Z)},$$

where A(Z) is expressed as:

$$A(Z) = \sum_{i=1}^{m} C_P(i,n)_K Z^{-i},$$

in which $C_P(i,n)_K$ is a pole prediction coefficient; and B(Z) is expressed as:

$$B(Z) = \sum_{i=1}^{l} C_Z(i,n)_K Z^{-i},$$

in which $C_{Z(i,n)K}$ is a pole prediction coefficient. Once the transmission characteristic H(Z) of the adaptive prediction filter 150 is determined, the transmission characteristic H'(Z) of the filter $140_K$ relating to the present embodiment can be expressed by a multiplication of the transmission characteristics of the filters 152 and 154. That is, $$H'(Z) = \frac{1}{H(Z)} \cdot \frac{1 + B'(Z)}{1 - A'(Z)}$$

where A'(Z) is expressed as:

$$A'(Z) = \sum_{i=1}^{m} C_p(i,n)_k \alpha^i Z^{-i},$$

in which $\alpha$ is the pole weighting coefficient, and B'(Z) is expressed as:

$$B'(Z) = \sum_{i=1}^{l} C_Z(i,n)_K \beta^i Z^{-i}.$$

in which $\alpha$ is the zero weighting coefficient.

Figure 16:
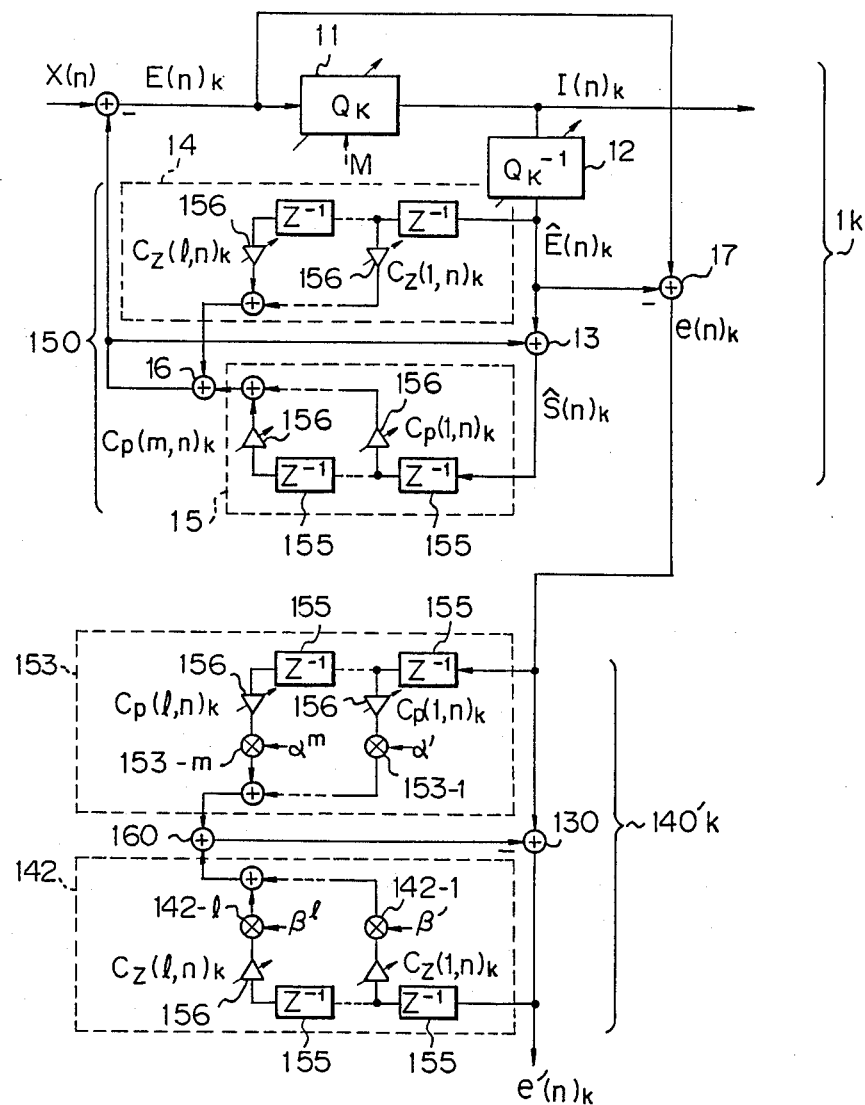
FIG. 16 shows another embodiment of the detailed construction of a part of the ADPCM coder shown in FIG. 14.

FIG. 16 shows another embodiment of the present invention in which the masking effect is also taken into consideration.

In FIG. 16, the adaptive prediction filter 152, having the inverse characteristic of the adaptive prediction filter 150, is not provided in an adaptive weighting filter $140_K'$. The other portions are the same as those in FIG. 15, and are labelled by the same reference numbers. The error signal $e(n)_K$, which is input into the adaptive weighting filter $140_K'$, is the same error signal $e(n)$ shown in FIG. 5 or $e(n)_1$ to $e(n)_K$ shown in FIG. 6. The error signal $e(n)$ obtained by the subtractor 17 is introduced into the pole prediction filter 153 and to the zero prediction filter 142 via an adder 130. The pole prediction filter 53 and the zero prediction filter 142 operate in the same way as those in FIG. 15. Thus, the additional error signal $e'(n)_K$, in which the hearing characteristic is taken into consideration, can be obtained at the output of the adder 130.

The circuit construction shown in FIG. 16, enables the inverse characteristic filter 152 to be omitted. Also, as an input of the adaptive weighting filter $140_K'$, the error signal $e(n)_K$ at the output of the subtractor 17 can be used without providing the additional adder 131 shown in FIG. 15 for subtracting the signal $S(n)_K$ from the input signal $X(n)$. Therefore, the circuit construction is very simple in comparison with FIG. 15.

According to the embodiments shown in FIGS. 15 and 16, since the adaptive weighting error signals are employed as the evaluating functions for selecting the optimum quantizer, so that the masking effect is taken into consideration, the hearing characteristic in the coding transmission equipment is greatly improved.

In the embodiments described with reference to FIGS. 14 to 16, it is of course possible to introduce the embodiment of the error correcting coder and decoder 81 and 82 described with reference to FIGS. 7 to 10, and the embodiment of the post processing filter 8 described with reference to FIGS. 11 and 12.

In the embodiments explained hereinbefore, the present invention is applied to the ADPCM system. But, of course, the present invention is not limited to the ADPCM system, namely, the present invention may be adapted to systems wherein the adaptive quantization is carried out as, for example, APCM (Adaptive Pulse Code Modulation), ADM (Adaptive Delta Modulation), SBC (Sub Band Coding), VRC (Variable Rate Coding), APC (Adaptive Predictive Coding), and ATC (Adaptive Transform Coding), etc.

We claim:

1. Coding transmission equipment for communication of an input signal, comprising:
   a transmitter device, comprising:
      a plurality of adaptive coding units each including an adaptive quantizer, operatively connected to receive the input signal, for outputting a quantized value according to the input signal and an error calculating unit, operatively connected to said adaptive quantizer, for calculating a quantization error of said adaptive quantizer, said adaptive quantizer in each of said adaptive coding units having a different updating speed of quantizing step size;
      an evaluating unit, operatively connected to said error calculating unit in each of said adaptive coding units, for outputting decision information indicating which of said adaptive coding units should be selected as an optimum adaptive coding unit to carry out optimum quantization at every frame of the input signal in dependence upon the quantization errors output by said error calculating unit in each of said plurality of adaptive coding units; and
      a sending unit, operatively connected to said adaptive quantizer in each of said adaptive coding units and said evaluating unit, for selecting an optimum quantized value output by the optimum adaptive coding unit in dependence upon the decision information output by said evaluating unit and transmitting the optimum quantized value together with the decision information identifying the optimum adaptive coding unit;
   a receiver device receiving the optimum quantized value and the decision information in a received signal, comprising:
      a dividing unit for dividing the received signal from said transmitter device into the quantized value and the decision information;
      an adaptive decoding unit, operatively connected to said dividing unit, for decoding the quantized value obtained by said dividing unit into the original input signal; and
      an optimum control unit, operatively connected to said dividing unit and said adaptive decoding unit, for controlling an updating speed of a quantizing step size of said adaptive decoding unit to coincide with the updating speed of the quantizing step size of the optimum adaptive coding unit in dependence upon the decision information obtained by said dividing unit.

2. Coding transmission equipment according to wherein said transmitter device further comprises a parameter copy unit, operatively connected to said adaptive coding units and said evaluating unit, for storing parameters determining inner conditions of each of said adaptive coding units and for outputting an optimum parameter of the optimum adaptive coding unit selected by said evaluating unit to said adaptive coding units at every frame, and
   wherein each of said adaptive coding units starts a signal process for a next frame after changing one of the inner conditions in accordance with the optimum parameter from said parameter copy unit.

3. Coding transmission equipment according to claim 2,
   wherein said transmitter device further comprises an error correction coding unit, operatively connected to said evaluating unit and said sending unit, for carrying out an error correction coding process on the decision information from said evaluating unit and outputting processed decision information to be sent to said receiver device, and
   wherein said receiver device further comprises an error correcting unit, operatively connected to said dividing unit and said optimum control unit, for carrying out an error correcting process on the decision information obtained by said dividing unit and outputting error corrected decision information to said optimum control unit.

4. Coding transmission equipment according to claim 2,
   wherein said receiver device further comprises a post-processing filter, operatively connected to said adaptive decoding unit, having a parameter, and
   wherein said adaptive decoding unit has a parameter and the parameter of said post-processing filter is varied in dependence upon changes in the parameter of said adaptive decoding unit.

5. Coding transmission equipment according to claim 2, wherein each said adaptive coding unit is an adaptive differential pulse code modulation coder.

6. Coding transmission equipment according to claim 2, wherein each said adaptive coding unit comprises:
   a subtractor, operatively connected to receive the input signal, for calculating a prediction error corresponding to a difference between the input signal and a predicted value;
   an adaptive quantizer, operatively connected to said subtractor and said sending unit, for adaptive quantization of the prediction error to produce the quantized value;
   an adaptive inverse quantizer, operatively connected to said adaptive quantizer, for adaptive inverse quantization of the quantized value from said adaptive quantizer to produce an inverse quantized value;
   a predictor, operatively connected to said adaptive inverse quantizer and said subtractor, for calculating the predicted value in dependence upon prior inverse quantized values produced by said adaptive inverse quantizer; and
   an error calculating unit, operatively connected to said subtractor and said adaptive inverse quantizer, for calculating the quantization error corresponding to a differential value between the prediction error and the inverse quantized value from said adaptive inverse quantizer.

7. Coding transmission equipment according to claim 6, wherein said predictor includes a zero predictor and a pole predictor each operatively connected to said adaptive inverse quantizer and said subtractor.

8. Coding transmission equipment according to claim 2, wherein the optimum parameter of the optimum adaptive coding unit to be copied by said parameter copy unit includes a quantization step size updating coefficient.

9. Coding transmission equipment according to claim 8, wherein the optimum parameter to be copied further includes tap data and a prediction coefficient of said predictor.

10. A transmitter device, used in coding transmission equipment, for carrying out coding of an input signal with adaptive quantization, comprising:

a plurality of adaptive coding units each including an adaptive quantizer, operatively connected to receive the input signal, for outputting a quantized value according to the input signal and an error calculating unit, operatively connected to said adaptive quantizer, for calculating a quantization error of said adaptive quantizer, said adaptive quantizer in each of said adaptive coding units having a different updating speed of a quantizing step size;

an evaluating unit, operatively connected to said error calculating unit in each of said adaptive coding units, for outputting decision information indicating which of said adaptive coding units should be selected as an optimum adaptive coding unit to carry out optimum quantization at every frame of the input signal in dependence upon the quantization error output by said error calculating unit in each of said plurality of adaptive coding units; and a sending unit, operatively connected to said adaptive quantizer in each of said adaptive coding units and said evaluating unit, for selecting an optimum quantized value output by the optimum adaptive coding unit in dependence upon the decision information output by said evaluating unit and transmitting an optimum quantized value together with the decision information identifying the optimum adaptive coding unit.

11. A transmitter device according to claim 10, further comprising a parameter copy unit, operatively connected to said adaptive coding units and said evaluating unit, for storing parameters determining inner conditions of each of said adaptive coding units and for outputting an optimum parameter of the optimum adaptive coding unit selected by said evaluating unit to said adaptive coding units at every frame, and wherein each of said adaptive coding units starts a signal process for a next frame after changing one of the inner conditions in accordance with the optimum parameter from said parameter copy unit.

12. A transmitter device according to claim 11, wherein each said adaptive coding unit is an adaptive differential pulse code modulation coder.

13. A transmitter device according to claim 11, wherein each said adaptive coding unit comprises:

a subtractor, operatively connected to receive the input signal, for calculating a prediction error corresponding to a difference between the input signal and a predicted value;

an adaptive quantizer, operatively connected to said subtractor and said sending unit, for adaptive quantization of the prediction error to produce the quantized value;

an adaptive inverse quantizer, operatively connected to said adaptive quantizer, for adaptive inverse quantization of the quantized value from said adaptive quantizer to produce an inverse quantized value;

a predictor, operatively connected to said adaptive inverse quantizer and said subtractor, for calculating the predicted value in dependence upon prior inverse quantized values produced by said adaptive inverse quantizer; and an error calculating unit, operatively connected to said subtractor and said adaptive inverse quantizer, for calculating the quantization error corresponding to a differential value between the prediction error and the inverse quantized value from said adaptive inverse quantizer.

14. A transmitter device according to claim 13, wherein said predictor includes a zero predictor and a pole predictor each operatively connected to said adaptive, quantizer and said subtractor.

15. A transmitter device according to claim 11, wherein the parameter of the optimum adaptive coding unit to be copied by said parameter copy unit includes a quantization step size updating coefficient.

16. A transmitter device according to claim 15, wherein the parameter to be copied further includes tap data and a prediction coefficient of said predictor.

17. Coding transmission equipment for communication of an input signal, comprising:

a transmitter device, comprising:

a plurality of adaptive coding units each including an adaptive quantizer, operatively connected to receive the input signal, for outputting a quantized value according to the input signal and an error calculating unit, operatively connected to said adaptive quantizer, for calculating a quantization error of said adaptive quantizer, said adaptive quantizer in each of said adaptive coding units having a different updating speed of quantizing step size determined in dependence upon an individual prediction coefficient;

a plurality of adaptive weighting filters, each operatively connected to said error calculating unit in a corresponding one of said adaptive coding units, each weighting the quantization error with the individual prediction coefficient used in the corresponding one of said adaptive coding units, each of said adaptive weighting filters outputting an additional quantization error in which a hearing characteristic is taken into consideration;

an evaluating unit, operatively connected to said adaptive weighting filters, for outputting decision information indicating which of said adaptive coding units should be selected as an optimum adaptive coding unit to carry out optimum quantization at every frame of the input signal in dependence upon the additional quantization errors output by said adaptive weighting filters; and a sending unit, operatively connected to said adaptive quantizer in each of said adaptive coding units and said evaluating unit, for selecting an optimum quantized value output by the optimum adaptive coding unit in dependence upon the decision information output by said evaluating unit and transmitting the optimum quantized value together with the decision information identifying the optimum adaptive coding unit;

a receiver device receiving the optimum quantized value and the decision information in a received signal, comprising:

a dividing unit for dividing the received signal from said transmitter device into the quantized value and the decision information;

an adaptive decoding unit, operatively connected to said dividing unit, for decoding the quantized value obtained by said dividing unit into the original input signal; and an optimum control unit, operatively connected to said dividing unit and said adaptive decoding unit, for controlling an updating speed of a quantizing step size of said adaptive decoding unit to coincide with the updating speed of the quantizing step size of the optimum adaptive coding unit in dependence upon the decision information obtained by said dividing unit.

18. Coding transmission equipment according to claim 17,
wherein said transmitter device further comprises:
a first parameter copy unit, operatively connected to said adaptive coding units and said evaluating unit, for storing parameters determining inner conditions of each of said adaptive coding units and for outputting and optimum coding parameter of the optimum adaptive coding unit selected by said evaluating unit to said adaptive coding units at every frame; and
a second parameter copy unit, operatively connected to said adaptive weighting filters and said evaluating unit, for storing parameters determining inner conditions of each of said adaptive weighting filters and for outputting an optimum filter parameter of said adaptive weighting filter in the optimum adaptive coding unit selected by said evaluating unit to said adaptive weighting filters at every frame, and
wherein each of said adaptive coding units starts a signal coding process for a next frame after changing one of the inner conditions therein in accordance with the optimum coding parameter from said parameter copy unit and each of said adaptive weighting filters starts a signal filtering process for the next frame after changing one of the inner conditions therein in accordance with the optimum filter parameter from said additional parameter copy unit.

19. Coding transmission equipment according to claim 18,
wherein said transmitter device further comprises an error correction coding unit, operatively connected to said evaluating unit and said sending unit, for carrying out an error correction coding process on the decision information from said evaluating unit and outputting processed decision information to be sent to said receiver device, and
wherein said receiver device further comprises an error correcting unit, operatively connected to said dividing unit and said optimum control unit, for carrying out an error correcting process on the decision information obtained by said dividing unit and outputting error corrected decision information to said optimum control unit.

20. Coding transmission equipment according to claim 18,
wherein said receiver device further comprises a post-processing filter, operatively connected to said adaptive decoding unit, having a parameter, and
wherein said adaptive decoding unit has a parameter and the parameter of said post-processing filter is varied in dependence upon changes in the parameter of said adaptive decoding unit.

21. Coding transmission equipment according to claim 18, wherein said adaptive coding units have a processing characteristic varying by a difference in quantization step size updating coefficients between said adaptive quantizers.

22. Coding transmission equipment according to claim 18, wherein each said adaptive coding unit is an adaptive differential pulse code modulation coder.

23. Coding transmission equipment according to claim 18, wherein each said adaptive coding unit comprises:
a subtractor, operatively connected to receive the input signal, for calculating a prediction error corresponding to a difference between the input signal and a predicted value;
an adaptive quantizer, operatively connected to said subtractor and said sending unit, for adaptive quantization of the prediction error to produce the quantized value;
an adaptive inverse quantizer, operatively connected to said adaptive quantizer, for adaptive inverse quantization of the quantized value from said adaptive quantizer to produce an inverse quantized value;
a predictor, operatively connected to said adaptive inverse quantizer and said subtractor, for calculating the predicted value in accordance with a characteristic determined in dependence upon prior inverse quantized values produced by said adaptive inverse quantizer;
an adder, operatively connected to the output of said adaptive inverse quantizer and to the output of said predictor, for calculating a reproduced signal; and
an error calculating unit, operatively connected to receive the input signal and the reproduced signal, for calculating the quantization error by subtracting the reproduced signal from the input signal.

24. Coding transmission equipment according to claim 23, wherein said transmitter device further comprises additional filters, each corresponding to one of said adaptive weighting filters and having an inverse characteristic of the characteristic of said predictor in the corresponding one of said adaptive coding units.

25. Coding transmission equipment according to claim 23, wherein said predictor includes a zero predictor and a pole predictor each operatively connected to said adaptive inverse quantizer and said subtractor.

26. Coding transmission equipment according to claim 23, wherein the optimum coding parameter of the optimum adaptive coding unit to be copied by said parameter copy unit includes a quantization step size updating coefficient.

27. Coding transmission equipment according to claim 26, wherein the optimum coding parameter to be copied further includes tap data and a prediction coefficient of said predictor.

28. Coding transmission equipment according to claim 18, wherein each said adaptive coding unit comprises:
a first subtractor, operatively connected to receive the input signal, for calculating a prediction error corresponding to a difference between the input signal and a predicted value;
an adaptive quantizer, operatively connected to said first subtractor and said sending unit, for adaptive quantization of the prediction error to produce the quantized value;
an adaptive inverse quantizer, operatively connected to said adaptive quantizer, for adaptive inverse quantization of the quantized value from said adaptive quantizer to produce an inverse quantized value;

a predictor, operatively connected to said adaptive inverse quantizer and said first subtractor, for calculating the predicted value in dependence upon prior inverse quantized values produced by said adaptive inverse quantizer; and a second subtractor, operatively connected to the output of said adaptive inverse quantizer and to the output of said first subtractor, for calculating the quantization error by subtracting the output of said adaptive inverse quantizer from the output of said first subtractor.

29. Coding transmission equipment according to claim 28, wherein said transmitter device further comprises additional filters, each corresponding to one of said adaptive weighting filters and having an inverse characteristic of the characteristic of said predictor in the corresponding one of said adaptive coding units.

30. Coding transmission equipment according to claim 28, wherein said predictor includes a zero predictor and a pole predictor each operatively connected to said adaptive inverse quantizer and said first subtractor.

31. Coding transmission equipment according to claim 26, wherein the optimum coding parameter of the optimum adaptive coding unit to be copied by said parameter copy unit includes a quantization step size updating coefficient.

32. Coding transmission equipment according to claim 31, wherein the optimum coding parameter to be copied further includes tap data and a prediction coefficient of said predictor.

33. A transmission device, used in coding transmission equipment, for carrying out coding of an input signal with adaptive quantization, comprising:

a plurality of adaptive coding units each including an adaptive quantizer, operatively connected to receive the input signal, for outputting a quantized value according to the input signal and an error calculation unit, operatively connected to said adaptive quantizer, for calculating a quantization error of said adaptive quantizer, said adaptive quantizer in each of said adaptive coding units having a different updating speed of quantizing step size determined in dependence upon an individual prediction coefficient;

a plurality of adaptive weighting filters, each operatively connected to said error in a corresponding one of said adaptive coding units, each for weighting the quantization error with the individual prediction coefficient used in the corresponding one of said adaptive coding units, each of said adaptive weighting filters outputting an additional quantization error in which a hearing characteristic is taken into consideration;

an evaluating unit, operatively connected to said adaptive weighting filters, for outputting decision information indicating which of said adaptive coding units should be selected as an optimum adaptive coding unit to carry out optimum quantization at every frame of the input signal in dependence upon the additional quantization errors output by said adaptive weighting filters; and a sending unit, operatively connected to said adaptive quantizer in each of said adaptive coding units and said evaluating unit, for selecting an optimum quantized value output by the optimum adaptive coding unit, in dependence upon the decision information output by said evaluating unit and transmitting the optimum quantized value together with the decision information identifying the optimum adaptive coding unit.

34. A transmission device according to claim 33, further comprising:

a first parameter copy unit, operatively connected to said adaptive coding units and said evaluating unit, for storing parameters determining inner conditions of each of said adaptive coding units and for outputting an optimum coding parameter of the optimum adaptive coding unit selected by said evaluating unit to said adaptive coding units at every frame; and a second parameter copy unit, operatively connected to said adaptive weighting filters and said evaluating unit, for storing parameters determining inner conditions of each of said adaptive weighting filters and for outputting an optimum filter parameter of said adaptive weighting filter in the optimum adaptive coding unit selected by said evaluating unit to said adaptive weighting filters at every frame, and wherein each of said adaptive coding units starts a signal coding process for a next frame after changing one of the inner conditions therein in accordance with the optimum coding parameter from said parameter copy unit and each of said adaptive weighting filters starts a signal filtering process for the next frame after changing one of the inner conditions therein in accordance with the optimum filter parameter from said additional parameter copy unit.

35. A transmission device according to claim 33, wherein said plurality of adaptive coding units have a processing characteristic varying by a difference in quantization step size updating coefficients between said adaptive quantizers.

36. A transmitter device according to claim 33, wherein each said adaptive coding unit is an adaptive differential pulse code modulator coder.

37. A transmission device according to claim 33, wherein each said adaptive coding unit comprises:

a subtractor, operatively connected to receive the input signal, for calculating a prediction error corresponding to a difference between the input signal and a predicted value;

an adaptive quantizer, operatively connected to said subtractor and said sending unit, for adaptive quantization of the prediction error to produce the quantized value;

an adaptive inverse quantizer, operatively connected to said adaptive quantizer, for adaptive inverse quantization of the quantized value from said adaptive quantizer to produce an inverse quantized value;

a predictor, operatively connected to said adaptive inverse quantizer and said subtractor, for calculating the predictor value in accordance with a characteristic determined in dependence upon prior inverse quantized values produced by said adaptive inverse quantizer;

an adder, operatively connected to the output of said adaptive inverse quantizer and to the output of said predictor, for calculating a reproduced signal; and an error calculating unit, operatively connected to receive the input signal and the reproduced signal, for calculating the quantization error by subtracting the reproduced signal from the input signal.

38. A transmission device according to claim 37, wherein further comprising additional filters, each corresponding to one of said adaptive weighting filters and having an inverse characteristic of the characteristic of said predictor in the corresponding one of said adaptive coding units.

39. A transmission device according to claim 33, wherein said predictor includes a zero predictor and a pole predictor each operatively connected to said adaptive inverse quantizer and said subtractor.

40. A transmission device according to claim 33, wherein the optimum coding parameter of the optimum adaptive coding unit to be copied by said parameter copy unit includes a quantization step size updating coefficient.

41. A transmission device according to claim 40, wherein the optimum coding parameter to be copied further includes tap data and a prediction coefficient of said predictor.

42. A transmission device according to claim 35, wherein each said adaptive coding unit comprises:
  a first subtractor, operatively connected to receive the input signal, for calculating a prediction error corresponding to a difference between the input signal and a predicted value;
  an adaptive quantizer, operatively connected to said first subtractor and said sending unit, for adaptive quantization of the prediction error to produce the quantized value;
  an adaptive inverse quantizer, operatively connected to said adaptive quantizer, for adaptive inverse quantization of the quantized value from said adaptive quantizer to produce an inverse quantized value;
  a predictor, operatively connected to said adaptive inverse quantizer and said first subtractor, for calculating the predicted value in dependence upon prior inverse quantized values produced by said adaptive inverse quantizer; and
  a second subtractor, operatively connected to the output of said adaptive inverse quantizer and to the output of said first subtractor, for calculating the quantization error by subtracting the output of said adaptive inverse quantizer from the output of said first subtractor.

43. A transmission device according to claim 42, wherein said transmitter device further comprises additional filters, each corresponding to one of said adaptive weighting filters and having an inverse characteristic of the characteristic of said predictor in the corresponding one of said adaptive coding units.

44. A transmission device according to claim 42, wherein said predictor includes a zero predictor and a pole predictor each operatively connected to said adaptive inverse quantizer and said first subtractor.

45. A transmission device according to claim 42, wherein the optimum coding parameter of the optimum adaptive coding unit to be copied by said parameter copy unit includes a quantization step size updating coefficient.

46. A transmission device according to claim 45, wherein the optimum coding parameter to be copied further includes tap data and a prediction coefficient of said predictor.

* * * * *

UNITED STATES PATENT AND TRADEMARK OFFICE
CERTIFICATE OF CORRECTION

PATENT NO. : 4,831,636

DATED : May 16, 1989

INVENTOR(S) : Taniguchi et al.

It is certified that error appears in the above-identified patent and that said Letters Patent is hereby corrected as shown below:

Front page (57) ABSTRACT, line 1, "an" should be --a--.

Col. 1, line 24, "rat" should be --rate--.

Col. 3, line 8, "decoder" should be --coder--;
      line 9, "receiver" should be --transmitter--;
      line 59, "$\hat{E}(n)$" should be --E(n)--.

Col. 4, line 46, "sep" should be --step--;
      line 64, "wit" should be --with--.

Col. 5, line 11, after "between" insert --the--.

Col. 5, line 11, "$\hat{E}(n)$" should be --E(n)--;
      line 12, "value of" should be --value $\hat{E}(n)$ of--;
      "$\hat{E}(n)$ from" should be --E(n) from--;
      line 48, "1" should be --$\ell$--;
      line 54, "$C_z(1, n)$" (second occurrence) should be --$C_z(\ell, n)$--;
      line 59, equation (2), line 2, "$(\hat{E}(n-i)$" should be --$(\hat{E}(n-i))$--;
      line 63, "$C_z(1, n)$" (second occurrence) should be --$C_z(\ell, n)$--;
      line 64, "$E(n-1)$" (second occurrence) should be --$E(n-\ell)$--;
      line 68, "$C_p(1, n)$" should be --$C_p(\ell, n)$--.

Col. 6, line 56, "71; a" should be --71; an--.

Col. 7, line 24, "E(n)" should be --$\hat{E}(n)$--;
      line 25, "y" should be --by--.

UNITED STATES PATENT AND TRADEMARK OFFICE
CERTIFICATE OF CORRECTION

PATENT NO. : 4,831,636            PAGE 2 of 3

DATED : May 16, 1989

INVENTOR(S) : Taniguchi et al.

It is certified that error appears in the above-identified patent and that said Letters Patent is hereby corrected as shown below:

Col. 9, line 61, "ECC(1)" should be --ECC($\ell$)--;
        line 62, "N(1)" should be --N($\ell$)--.

Col. 10, line 27, "ECC(1)" should be --ECC($\ell$)--;
         line 38, "postprocess-" should be --post-process--.

Col. 12, line 37, "ar" should be --are--.

Col. 13, line 10, "e(n)K" should be --e(n)$_K$--;
         line 16, "C$_p$(m,n)K" should be --C$_p$(m,n)$_K$--;
         line 19, "C$_z$(1,n)$_K$" should be --C$_z$($\ell$,n)$_K$--;
         line 33, "C$_z$(1,n)$_K$" (second occurrence) should be
           --C$_z$($\ell$,n)$_K$--;
         line 35, "142-1" should be --142-$\ell$--;
         line 36, "$\beta_1$" (second occurrence) should be --$\beta_\ell$--;
         line 38, "C$_z$(1,n)$_{K'}$" should be --C$_z$($\ell$,n)$_{K'}$--;
         line 47, "C$_z$(1,n)K to C$_z$(1,n)$_K$" should be
           --C$_z$(1,n)$_K$ to C$_z$($\ell$,n)$_K$--;
         line 52, (line 1 of formula), "1" should be --$\ell$--;
         line 66, "C$_z$(i,n)K" should be --C$_z$(i,n)$_K$--.

Col. 14, line 1, "the filter" should be --the adaptive weighting filter--;

UNITED STATES PATENT AND TRADEMARK OFFICE
CERTIFICATE OF CORRECTION

PATENT NO. : 4,831,636

DATED : May 16, 1989

INVENTOR(S) : Taniguchi et al.

It is certified that error appears in the above-identified patent and that said Letters Patent is hereby corrected as shown below:

Col 14, line 12, (second line of formula), "$C_p(i,n)_k$" should be --$C_p(i,n)_K$--;

line 17, "$\sum_{i=1}^{1}$" should be --$\sum_{i=1}^{\ell}$--.

Col. 15, line 54, "according to" should be --according to claim 1,--.

Col. 21, line 23, "claim 26," should be --claim 28,--;
line 46, "error in" should be --error calculating unit in--.

Col. 23, line 21, "claim 35," should be --claim 33,--.

Signed and Sealed this

Second Day of January, 1990

Attest:

JEFFREY M. SAMUELS

Attesting Officer    Acting Commissioner of Patents and Trademarks

UNITED STATES PATENT AND TRADEMARK OFFICE
CERTIFICATE OF CORRECTION

PATENT NO. : 4,831,636　　　　　　　　　　　PAGE 1 of 3

DATED : May 16, 1989

INVENTOR(S) :
　　　　Taniguchi et al.

It is certified that error appears in the above-identified patent and that said Letters Patent is hereby corrected as shown below:

Front page (57) ABSTRACT, line 1, "an" should be --a--.

Col. 1, line 24, "rat" should be --rate--.

Col. 3, line 8, "decoder" should be --coder--;
　　　　line 9, "receiver" should be --transmitter--;
　　　　line 59, "$\hat{E}(n)$" should be --E(n)--.

Col. 4, line 46, "sep" should be --step--;
　　　　line 64, "wit" should be --with--.

Col. 5, line 11, "$\hat{E}(n)$" should be --E(n)--; after
　　　　　　　　"between" insert --the--;
　　　　line 12, "value of" should be --value $\hat{E}(n)$ of--;
　　　　　　　　"$\hat{E}(n)$ from" should be --E(n) from--;
　　　　line 48, "1" should be --$\ell$--;
　　　　line 54, "$C_z(1, n)$" (second occurrence) should be
　　　　　　　　--$C_z(\ell, n)$--;
　　　　line 59, equation (2), line 2, "$(\hat{E}(n-i)$" should be
　　　　　　　　--$(\hat{E}(n-i))$--;
　　　　line 63, "$C_z(1, n)$" (second occurrence) should be
　　　　　　　　--$C_z(\ell, n)$--;
　　　　line 64, "E(n-1)" (second occurrence) should be
　　　　　　　　--$E(n-\ell)$--;
　　　　line 68, "$C_p(1, n)$" should be --$C_p(\ell, n)$--.

Col. 6, line 56, "71; a" should be --71; an--.

Col. 7, line 24, "E(n)" should be --$\hat{E}(n)$--;
　　　　line 25, "y" should be --by--.

UNITED STATES PATENT AND TRADEMARK OFFICE
CERTIFICATE OF CORRECTION

PATENT NO. : 4,831,636

DATED : May 16, 1989

INVENTOR(S) : Taniguchi et al.

It is certified that error appears in the above-identified patent and that said Letters Patent is hereby corrected as shown below:

Col. 9, line 61, "ECC(1)" should be --ECC($\ell$)--;
line 62, "N(1)" should be --N($\ell$)--.

Col. 10, line 27, "ECC(1)" should be --ECC($\ell$)--;
line 38, "postprocess-" should be --post-process- --.

Col. 12, line 37, "ar" should be --are--.

Col. 13, line 10, "e(n)K" should be --$e(n)_K$--;
line 16, "$C_p(m,n)K$" should be --$C_p(m,n)_K$--;
line 19, "$C_z(1,n)_K$" should be --$C_z(\ell,n)_K$--;
line 33, "$C_z(1,n)_K$" (second occurrence) should be
    --$C_z(\ell,n)_K$--;
line 35, "142-1" should be --142-$\ell$--;
line 36, "$\beta_1$" (second occurrence) should be --$\beta_{\bar{\ell}}$--;
line 38, "$C_z(1,n)_K$," should be --$C_z(\ell,n)_K$,--;(2nd occurrence)
line 47, "$C_z(1,n)K$ to $C_z(1,n)_K$" should be
    --$C_z(1,n)_K$ to $C_z(\ell,n)_K$--;
line 62, (in formula) " $\sum_{i=1}^{1}$ " should be
    -- $\sum_{i=1}^{\ell}$ --;
line 66, "$C_{z(i,n)K}$" should be --$C_z(i,n)_K$--.

UNITED STATES PATENT AND TRADEMARK OFFICE
CERTIFICATE OF CORRECTION

PATENT NO. : 4,831,636

DATED : May 16, 1989

INVENTOR(S) : Taniguchi et al.

It is certified that error appears in the above-identified patent and that said Letters Patent is hereby corrected as shown below:

Col. 14, line 1, "the filter" should be --the adaptive weighting filter--;

line 12, (second line of formula), "$C_p(i,n)_k$" should be --$C_p(i,n)_K$--;

line 17, "$\sum_{i=1}^{1}$" should be --$\sum_{i=1}^{\ell}$--.

Col. 15, line 54, "according to" should be --according to claim 1,--.

Col. 21, line 23, "claim 26," should be --claim 28,--;
line 46, "error in" should be --error calculating unit in--.

Col. 23, line 21, "claim 35," should be --claim 33,--.

This certificate supersedes Certificate of Correction issued January 2, 1990.

Signed and Sealed this

Twenty-seventh Day of March, 1990

Attest:

JEFFREY M. SAMUELS

*Attesting Officer*   *Acting Commissioner of Patents and Trademarks*